March 5, 1968 P. KEHLER 3,371,733
FULLY TRACKED VEHICLE
Filed Aug. 30, 1965 2 Sheets-Sheet 1

INVENTOR.

PAUL KEHLER

March 5, 1968     P. KEHLER     3,371,733

FULLY TRACKED VEHICLE

Filed Aug. 30, 1965     2 Sheets-Sheet 2

INVENTOR.

PAUL KEHLER

United States Patent Office 3,371,733
Patented Mar. 5, 1968

3,371,733
FULLY TRACKED VEHICLE
Paul Kehler, 6752 Sy Road, Niagara Falls, N.Y. 14304
Filed Aug. 30, 1965, Ser. No. 483,764
1 Claim. (Cl. 180—6.7)

ABSTRACT OF THE DISCLOSURE

A power driven vehicle having a plurality of side by side ground-engaging endless track members so that the entire lower surface of the vehicle is track-supported, with drive means for the outer tracks and differential drive means for the inner tracks, the two outer tracks being independently power driven and the differential drive means causing each inner track to be driven at a speed intermediate the speeds of its two adjacent tracks.

---

On adverse terrain such as muddy roads, bogs, sand dunes, and deep snow, tracked vehicles have an increased mobility and weight carrying ability when compared with vehicles on wheels. Conventionally, two tracks are applied to tracked vehicles, one on each side of the vehicle.

Now, it is obvious that the load carrying ability of tracked vehicles in adverse terrain is increased considerably, when additional tracks are applied to the underside of the vehicle, thereby increasing the area which is supporting the weight of the vehicle.

The mobility and maneuverability of such multitracked vehicles is improved considerably, when the track suspension system and the power transmission system are designed in a way that permits power to be applied to all tracks simultaneously and differentially, causing the tracks to move in a direction and at a speed that is desired for an intended maneuver, be it forward drive, reverse drive, wide turns, or on-the-spot turns.

None of the designs presently known to the public (see references) is equipped fully with powered tracks, or completely "bellyless," because until now it has always been considered necessary to have a portion of the undersection of the vehicle employed to get the power drive down to the tracks, and to provide the supporting structure between the suspension system and the rest of the vehicle.

The present invention describes a fully tracked, bellyless vehicle, all tracks of said vehicle being powered for improved mobility.

One object of this invention is to provide a method of suspending a multiplicity of inner tracks in such a way that they cover substantially the whole underside of the vehicle, and of suspending two powered outer tracks in such a way that they cover and protect the supporting structure between the suspension system and the main body of the vehicle, as well as the power drive mechanism of the tracks.

Another object of this invention is to provide a system of differential gears, to be employed in said fully tracked vehicle in such a manner that all tracks, outer as well as inner ones, are driven individually at such a rate which is required for maneuvers such as forward drive, reverse drive, wide right and left turns, and on-the-spot turns.

The novel features which I believe to be characteristic of this invention are set forth in the appended claim. The principles of the invention, however, are best understood from the following description of a specific embodiment of the invention, read in connection with the accompanying drawings, in which:

Figure 1:
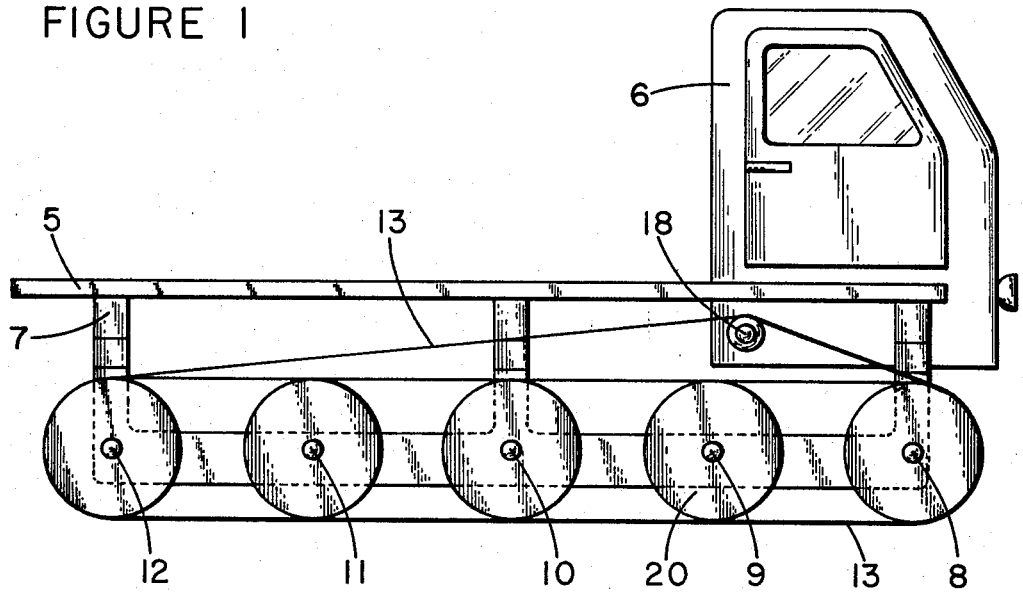
FIGURE 1 is the side elevation of the embodiment of the invention.
Figure 2:
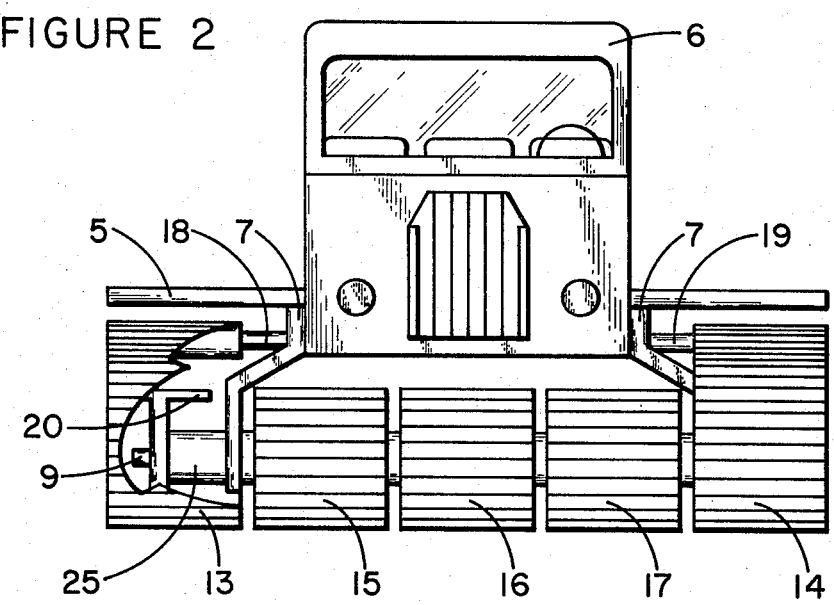
FIGURE 2 is the front elevation of the embodiment shown in FIGURE 1, with a part of one outer track and one wheel removed.
Figure 3:
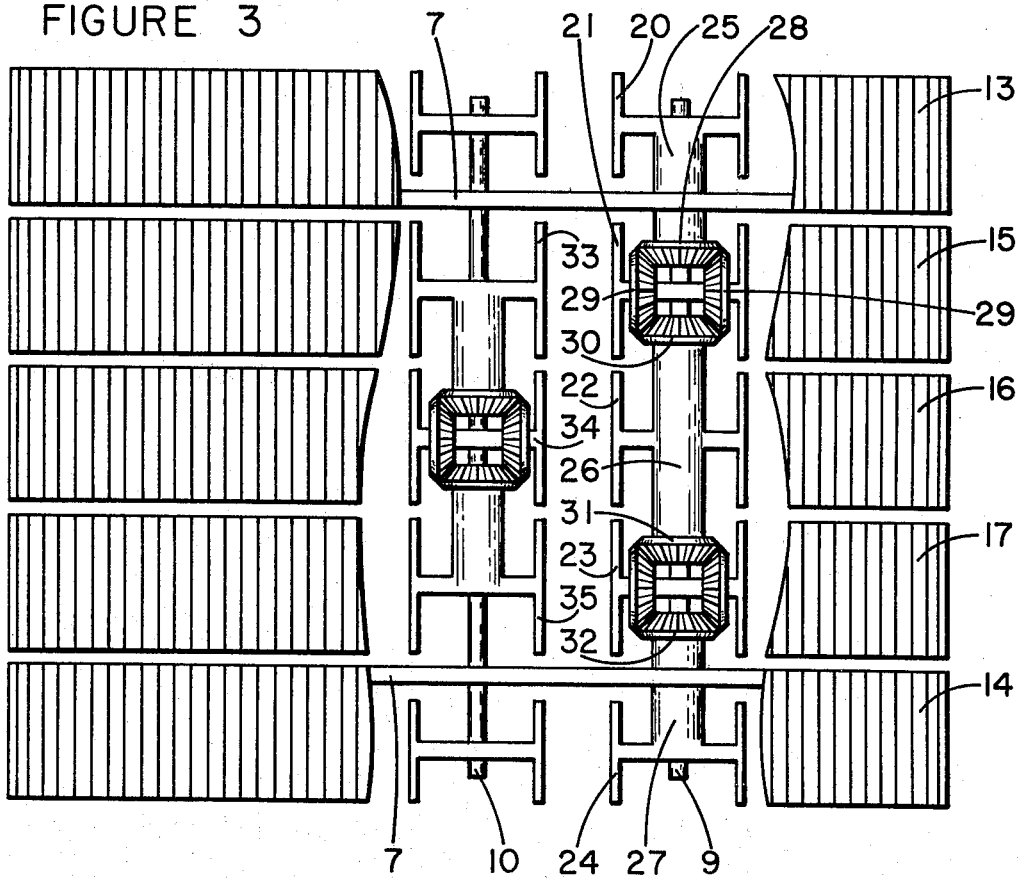
FIGURE 3 is a bottom plan view of the embodiment shown in the FIGURES 1 and 2, with parts of the tracks removed to show the differential drive mechanism powering the inner tracks.
Figure 4:
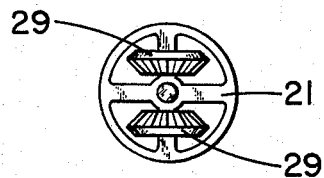
FIGURE 4 is the side elevation of a wheel, such as used for carrying an inner track and serving as a component of the differential drive system powering this track.

Reference will now be made by using numerals which designate corresponding parts shown in the FIGURES 1, 2, 3, and 4.

The vehicle shown in these figures consists of a body 5 to which is attached a cabin 6 and a frame 7. The frame 7 carries the suspension system of the tracks, consisting of a multiplicity of wheels mounted on the axles 8, 9, 10, 11, and 12. On the wheels are mounted the outer tracks 13 and 14 and the inner tracks 15, 16, and 17. Power plants that are not the object of this invention, drive the shafts 18 and 19, which are engaged to the outer tracks 13 and 14. When straight travel is desired (forwards or backwards), the shafts 18 and 19 are turned in the same direction and at the same speed. For wide turns, the shafts 18 and 19 are turned in the same direction, but at different speeds. For on-the-spot turns, the shafts 18 and 19 are driven in opposite directions.

A differential drive mechanism, incorporated in the track suspension system, applies power to each of the inner tracks. This differential drive mechanism utilizes a multiplicity of epicyclic bevel gear trains and the tracks themselves, and operates as follows:

The powered shaft 18 is connected to and moves track 13, transmitting power to wheel 20. Wheel 20 is attached rigidly to one end of the hollow shaft 25, which is mounted on axle 9 and carries on its other end a bevel gear 28. This bevel gear 28 meshes with two pinions 29 that are mounted on the spokes of wheel 21. These pinions 29, in turn, mesh with a bevel gear 30, which is attached rigidly to one end of the hollow shaft 26. Another bevel gear 31 is attached rigidly to the other end of the shaft 26. Wheel 22, carrying track 16, is also attached rigidly to shaft 26. Bevel gear 31 meshes with two pinions mounted on the spokes of wheel 23, and these in turn mesh with bevel gear 32, which is attached to hollow shaft 27 and wheel 24. Wheel 24 is driven, through track 14, by the powered shaft 19. The epicyclic bevel gear train mounted to wheel 21, consisting of the bevel gears 28 and 30 and the pinions 29, works in such a manner that:

If wheel 20 is rotating in the same direction and with the same speed as wheel 22, wheel 21 will also rotate in the same direction and with the same speed. If wheel 20 is rotating in the same direction as wheel 22, but at a different speed, wheel 21 will rotate in the same direction at a speed intermediate between the two. If the wheels 20 and 22 rotate in opposite directions at direction speeds, wheel 21 will follow the more rapidly moving wheel at a reduced speed, this speed being intermediate between the speeds of the wheels 20 and 22. If the wheels 20 and 22 rotate in opposite directions at the same speed, pinions 29 will rotate around the spokes of wheel 21, but wheel 21 will remain stationary in reference to axle 9.

Briefly, then, the effect of the epicyclic bevel gear train mounted to wheel 21, causes this wheel to rotate at a speed that is the average between the speeds of the wheels 20 and 22. Since the wheels 20, 21, and 22 are connected to the tracks 13, 15, and 16, respectively, the effect of the gear train mounted to wheel 21 is, that power is applied to track 15, causing this track to move at a speed that is intermediate between the speeds of the tracks 13 and 16.

Similarly, the effect of the epicyclic bevel gear train mounted to wheel 23 is, that power is applied to track 17, causing this track to move at a speed that is intermediate between the speeds of the tracks 14 and 16.

It is not necessary that both of the described epicyclic bevel gear trains are mounted on the same axle 9. The significant requirement is that three adjacent wheels (or tracks) are connected by a gear train as described above.

Track 16, for example, is powered by wheel 34, which is mounted on axle 10 and, because of the epicyclic bevel gear train mounted to it, is turning at a speed that is intermediate to the speeds of wheels 33 and 35, or the tracks 15 and 17.

The preceding description and the FIGURES 1, 2, 3, and 4 show how a vehicle could be designed that has its whole underside covered by tracks, these tracks being powered individually with differentiated speeds that correspond to the desired maneuver: each inner track moves at a speed that is intermediate to the speeds of the two tracks adjacent to it. Although this specific embodiment of the invention has been illustrated and described, it is understood that various alterations in the details of construction can be made without departing from the scope of the invention which is indicated in the appended claim.

I claim:
1. A vehicle comprising a main body, a support structure, and a track suspension system, said track suspension system carrying a plurality of inner tracks and two outer tracks, said inner and outer tracks covering substantially the whole underside of the vehicle, drive means for individually driving said outer tracks in the same or in opposite directions at the same or at different speeds, driven means for driving said inner tracks, and differential drive means for transmitting power from said outer tracks to said driven means of said inner tracks for causing each inner track to move with a speed that is intermediate the speeds of its two adjacent tracks when said outer tracks are driven at different speeds, said differential drive means including a plurality of epicyclic bevel gear means, one of said epicyclic bevel gear means operably connected to each each of said driven means of said inner tracks.

References Cited
UNITED STATES PATENTS

| | | | |
|---|---|---|---|
| 1,318,189 | 10/1919 | Tritton | 180—6.7 X |
| 1,749,276 | 3/1930 | Edmonds | 115—1 |
| 2,154,377 | 4/1939 | Cory | 180—9.2 |

BENJAMIN HERSH, *Primary Examiner.*

J. A. PEKAR, *Assistant Examiner.*